United States Patent
Woods et al.

(10) Patent No.: US 7,444,290 B2
(45) Date of Patent: Oct. 28, 2008

(54) ELECTRONIC SHIPPING SYSTEM FOR PACKAGE PICKUP AND ANYWHERE TO ANYWHERE DELIVERY

(75) Inventors: Bruce Woods, Stockholm, NJ (US);
Mike Donohue, Cumming, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 11/332,556

(22) Filed: Jan. 12, 2006

(65) Prior Publication Data

US 2006/0116923 A1    Jun. 1, 2006

Related U.S. Application Data

(62) Division of application No. 10/112,621, filed on Mar. 29, 2002, now abandoned.

(60) Provisional application No. 60/280,063, filed on Mar. 30, 2001.

(51) Int. Cl.
*G06Q 30/00* (2006.01)
(52) U.S. Cl. ......................................................... 705/1
(58) Field of Classification Search ...................... 705/1
See application file for complete search history.

(56) References Cited

U.S. PATENT DOCUMENTS

| | | | |
|---|---|---|---|
| 4,839,813 A | 6/1989 | Hills et al. | |
| 5,233,532 A | 8/1993 | Ramsden | |
| 5,310,997 A | 5/1994 | Roach et al. | |
| 5,315,508 A * | 5/1994 | Bain et al. | 705/28 |
| 5,369,221 A | 11/1994 | Ramsden | |
| 5,375,240 A | 12/1994 | Grundy | |
| 5,434,394 A | 7/1995 | Roach et al. | |
| 5,481,464 A | 1/1996 | Ramsden | |
| 5,602,742 A | 2/1997 | Solondz et al. | |
| 5,656,799 A | 8/1997 | Ramsden et al. | |
| 5,808,894 A | 9/1998 | Wiens et al. | |
| 5,828,322 A | 10/1998 | Eberhard | |
| 5,875,434 A | 2/1999 | Matsuoka et al. | |
| 5,890,136 A | 3/1999 | Kipp | |
| 5,910,896 A | 6/1999 | Hahn-Carlson | |
| 5,918,220 A | 6/1999 | Sansone et al. | |

(Continued)

FOREIGN PATENT DOCUMENTS

EP    1150227 A1    10/2001

(Continued)

OTHER PUBLICATIONS

RPS Adds Automated Package Pick-up to Redesigned Web Site; Other Expanded Features Include Overnight Service Maps and Zip-To-Zone Charts, Nov. 11, 1998, PR Newswire, Financial News, pp. 1-3.*

(Continued)

*Primary Examiner*—Jamisue A Plucinski
(74) *Attorney, Agent, or Firm*—Alston & Bird LLP (57) ABSTRACT

The present invention is an improved shipping system that provides for third-party billing and shipment of a package from a first location to a second location where neither the first or second location is the location of the third-party. An embodiment is disclosed in which a pre-existing call-tag system is modified to permit third-party billing and anywhere to anywhere functionality.

8 Claims, 9 Drawing Sheets

U.S. PATENT DOCUMENTS

| | | | |
|---|---|---|---|
| 5,930,768 | A | 7/1999 | Hooban |
| 5,971,273 | A | 10/1999 | Vallaire |
| 5,971,587 | A | 10/1999 | Kato et al. |
| 5,983,200 | A | 11/1999 | Slotznick |
| 5,991,739 | A | 11/1999 | Cupps et al. |
| 6,006,200 | A | 12/1999 | Boies et al. |
| 6,016,504 | A | 1/2000 | Arnold et al. |
| 6,026,378 | A | 2/2000 | Onozaki |
| 6,035,291 | A | 3/2000 | Thiel |
| 6,064,979 | A | 5/2000 | Perkowski |
| 6,064,981 | A | 5/2000 | Barni et al. |
| 6,070,150 | A | 5/2000 | Remington et al. |
| 6,085,170 | A | 7/2000 | Tsukuda |
| 6,085,172 | A | 7/2000 | Junger |
| 6,105,014 | A | 8/2000 | Ramsden et al. |
| 6,161,181 | A | 12/2000 | Haynes, III et al. |
| 6,175,825 | B1 | 1/2001 | Fruechtel |
| 6,199,052 | B1 | 3/2001 | Mitty et al. |
| 6,208,973 | B1 | 3/2001 | Boyer et al. |
| 6,219,653 | B1 | 4/2001 | O'Neill et al. |
| 6,246,998 | B1 | 6/2001 | Matsumori |
| 6,571,213 | B1 | 5/2003 | Altendahl et al. |
| 6,748,366 | B1 | 6/2004 | Hurwitz et al. |
| 7,158,941 | B1 * | 1/2007 | Thompson ............ 705/8 |
| 2001/0044785 | A1 | 11/2001 | Stolfo et al. |
| 2002/0010634 | A1 | 1/2002 | Roman et al. |
| 2002/0013739 | A1 * | 1/2002 | O'Donnell et al. ........... 705/26 |
| 2002/0013744 | A1 | 1/2002 | Tsunenari et al. |
| 2002/0016726 | A1 | 2/2002 | Ross |
| 2002/0019761 | A1 | 2/2002 | Lidow |
| 2002/0019777 | A1 | 2/2002 | Schwab et al. |
| 2002/0032612 | A1 | 3/2002 | Williams et al. |
| 2002/0073039 | A1 | 6/2002 | Ogg et al. |
| 2002/0095347 | A1 | 7/2002 | Cummiskey |

FOREIGN PATENT DOCUMENTS

| | | |
|---|---|---|
| FR | 2 561 949 A | 10/1985 |
| JP | 03-108058 | 5/1991 |
| JP | 05-067116 | 3/1993 |
| JP | 09-20411 A | 1/1997 |
| JP | 2000-003396 | 1/2000 |
| JP | 2002-205821 A | 7/2002 |
| WO | WO 99/66428 | 12/1999 |
| WO | WO 00/14648 | 3/2000 |
| WO | WO 00/30014 A1 | 5/2000 |
| WO | WO 00/70519 | 11/2000 |
| WO | WO 00/70519 A3 | 11/2000 |
| WO | WO 01/16889 A1 | 3/2001 |
| WO | WO 01/18712 A1 | 3/2001 |
| WO | WO 01/29778 A1 | 4/2001 |
| WO | WO 01/35344 A2 | 5/2001 |
| WO | WO 01/67344 A1 | 9/2001 |
| WO | WO 01/72109 A2 | 10/2001 |
| WO | WO 01/88831 A2 | 11/2001 |
| WO | WO 02/07104 A1 | 1/2002 |
| WO | WQO 02/17045 A2 | 2/2002 |
| WO | WO 02/052378 A2 | 7/2002 |

OTHER PUBLICATIONS

Materials evidencing UPS-NESCROW relationship.

* cited by examiner

ELECTRONIC SHIPPING SYSTEM FOR PACKAGE PICKUP AND ANYWHERE TO ANYWHERE DELIVERY

CROSS-REFERENCE TO RELATED APPLICATIONS

This application is a divisional of U.S. application Ser. No. 10/112,621, filed Mar. 29, 2002 now abandoned, which is hereby incorporated by reference, and which claims the benefit of priority from the U.S. provisional application No. 60/280,063 filed on Mar. 30, 2001 and entitled "Electronic Shipping System For Package Pickup And Anywhere to Anywhere Delivery" the entire contents of which is hereby incorporated by reference.

FIELD OF THE INVENTION

The present invention relates to an improved method and system for shipping packages and, in particular, describes an electronic shipping system for package pickup, anywhere to anywhere delivery and third-party billing.

BACKGROUND OF THE INVENTION

The increased popularity of the World Wide Web has led to an explosion in catalog and online shopping. The growth in e-commerce reflects in part increased purchases from veteran online shoppers, deeper Internet penetration across the country and the increased number of familiar bricks-and-mortar retailers online.

Some of the benefits to purchasing products online include the ability to avoid crowds, perform quick price comparisons across multiple sellers, and access a wider selection of products. However, there are drawbacks to purchasing goods through a retailer web site. One drawback is the inability to inspect an item before making the purchase. A consumer that buys a product offline at a traditional retail store usually has the opportunity to inspect the color, size and quality of workmanship of a good before the purchase is made. In contrast, when a consumer shops online their decision to purchase is based largely on a written description of the product and/or a photograph of the item. No opportunity to inspect the product occurs until after the product is purchased and shipped to the consumer. As a result, many products that are purchased online are returned.

Figure 1:
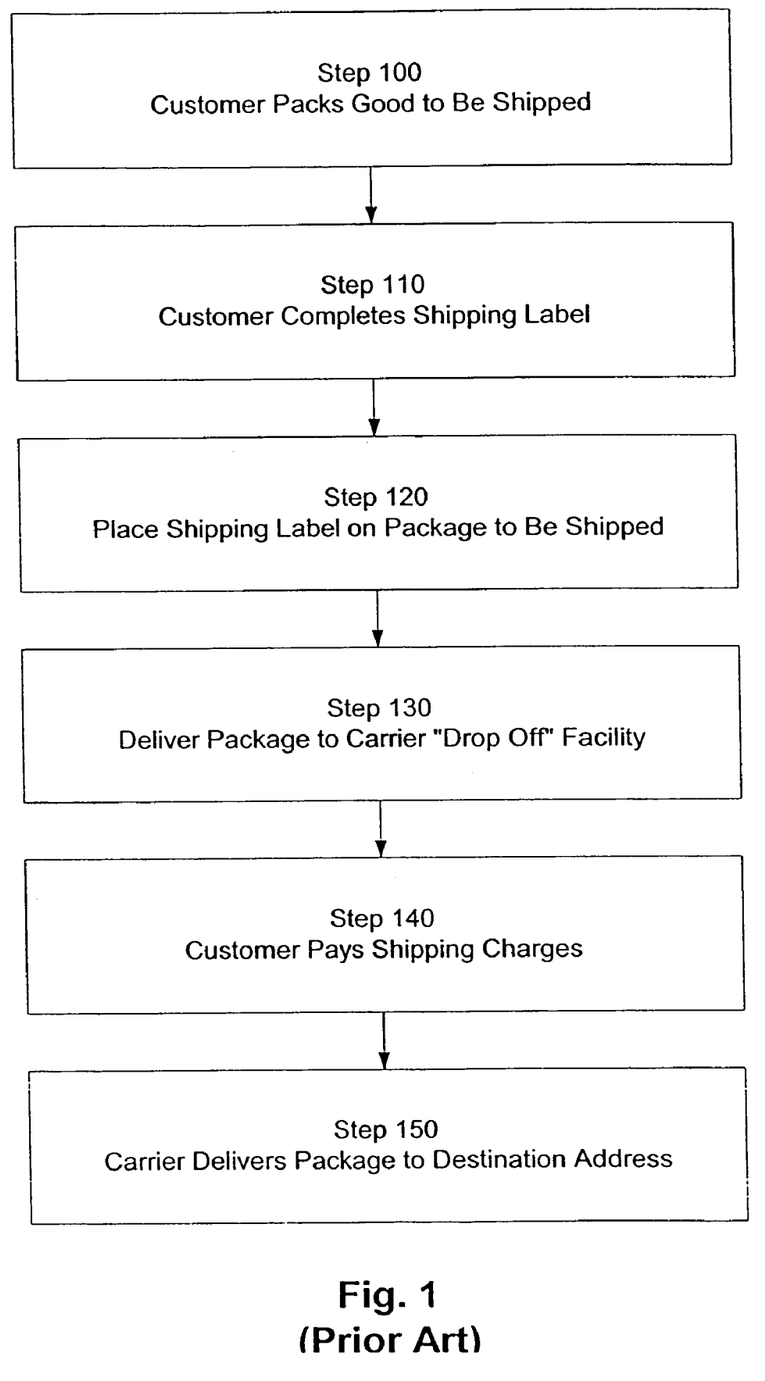
FIG. 1 is a process flow diagram of a traditional shipping system known in the art.

A traditional process by which a product is shipped via a commercial carrier is illustrated in FIG. 1. In Step 100, a customer places the good to be shipped in a box or other shipping container. In Step 110 the customer completes a shipping label, which includes, among other things, the destination address for the package. The shipping label may be written directly on the package to be shipped or may be a preprinted shipping label form with spaces where the customer enters the origination shipping address and a destination shipping address.

In Step 120, the customer affixes the shipping label to the package, or in some cases the customer may skip the shipping label step and write the shipping information on the package to be shipped.

In Step 130, the package is placed into the carrier system. In most cases, the customer physically takes the package to one of several drop off locations operated by a carrier.

In Step 140, the customer is billed for and pays the shipping fee associated with shipping the package. The shipping fee is generally based on the size of the package and the locations of the origination and destination addresses. Finally, in Step 150 the carrier delivers the package to the destination address.

The traditional shipping process illustrated in FIG. 1 remains a viable model that commercial carriers still use today. This shipping process, however, is not particularly well suited to the Internet sales model and, more particularly, to the return of goods purchased from a website. As indicated above, goods purchased over the Internet are often returned because the buyer has not had an opportunity to inspect the item prior to the purchase. Under the traditional shipping method, the customer must re-package the good to be returned, complete a shipping label, locate a carrier drop off facility, deliver the good to the facility and, in some cases, pay a return shipping fee. Not surprisingly, many of the customers who attempted to save time by purchasing a good over the Internet or through a catalog become dissatisfied when they are forced to go through the time-consuming and sometimes costly process of returning a good using the traditional shipping method described above.

Figure 2:
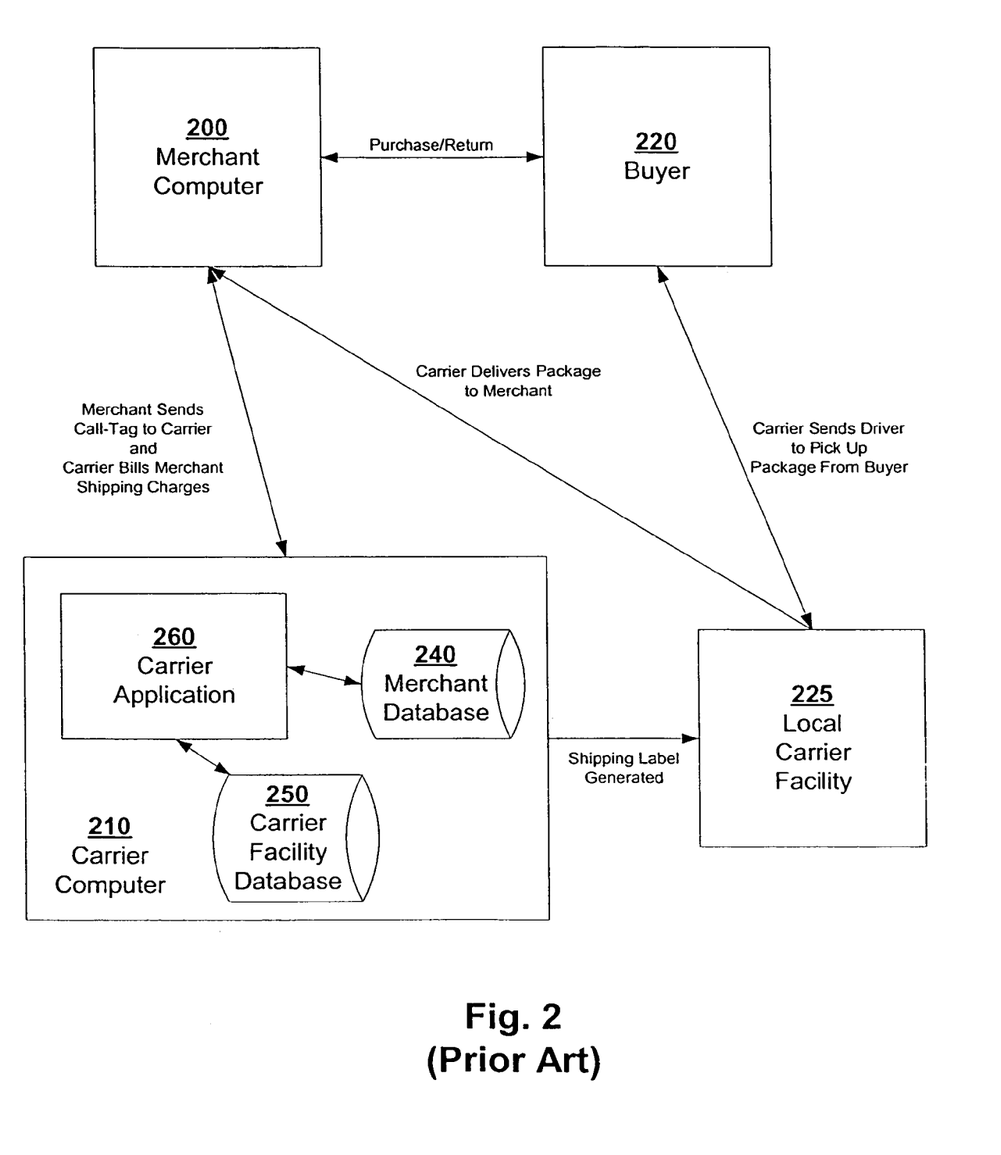
FIG. 2 is a high-level block diagram that illustrates the architecture of a call-tag system as known in the art.

In an effort to streamline the return of goods to a merchant, commercial carriers have offered alternative shipping solutions. One such alternative is known as a call-tag system 100. FIG. 2 illustrates a call-tag system 100 that improves on the traditional process described above in that it provides for carrier pick up of the package and allows the merchant to pay the return shipping fee. The system 100 includes a merchant computer 200, a carrier computer 210, a buyer 220 and a local carrier facility 225. In addition, a merchant database 240, a carrier facility database 250 and a carrier call-tag application 260 reside on the carrier computer 210.

Figure 3:
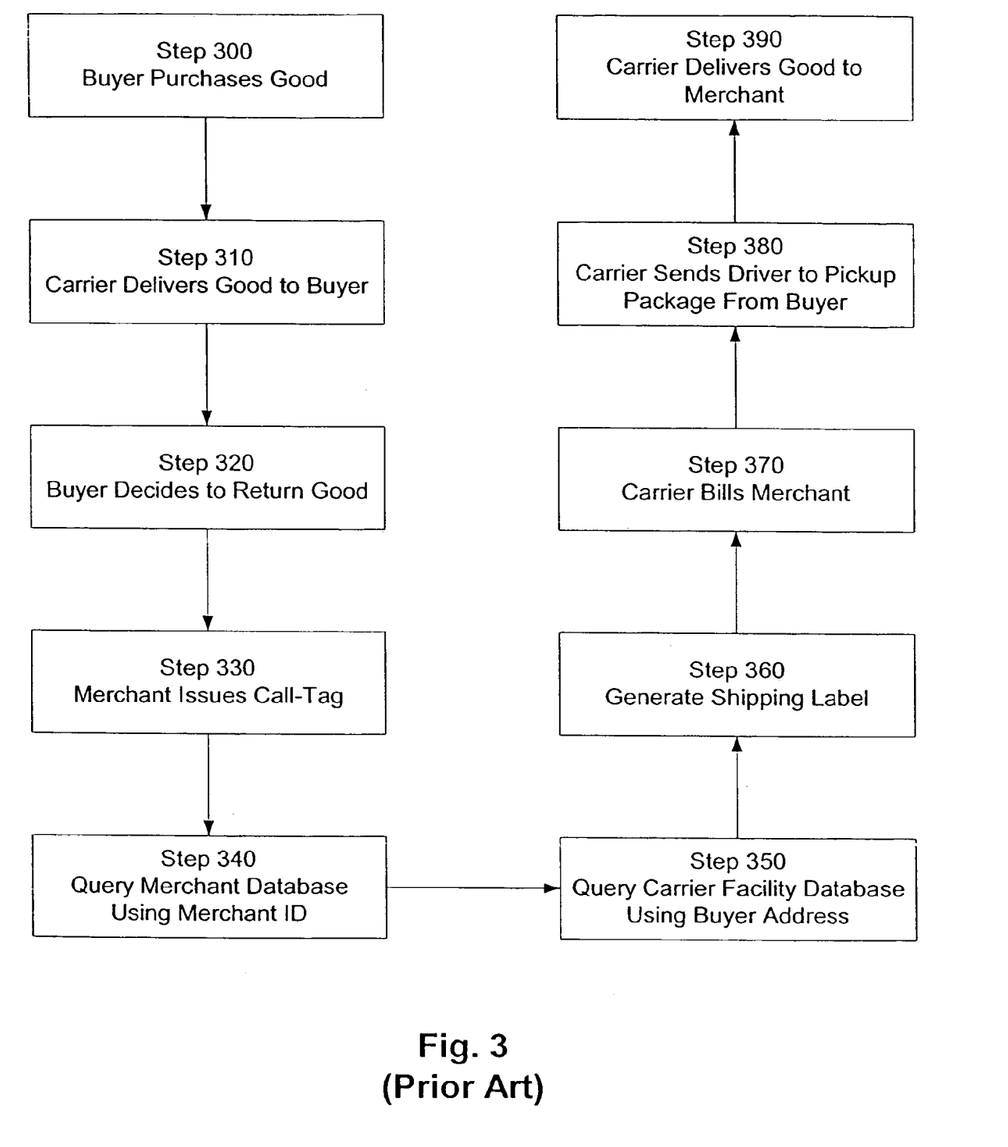
FIG. 3 is a process flow diagram of a call-tag system as known in the art.

The operation of a call-tag is illustrated in FIG. 3. In Step 300, a buyer 220 purchases a good from a merchant and the merchant ships the good to the buyer 220 via a carrier. In Step 310, the carrier delivers the good to the buyer 220. In Step 320, the buyer 220 decides to return the good and notifies the merchant of that decision. In response to the buyer's return request, the merchant sends an electronic call-tag request 265 via the merchant computer 200 to the carrier computer 210 (Step 330).

The call-tag request 265 is an electronic file that includes, among other things, the buyer address and a merchant identification number. In Step 340, the call-tag application 260 receives the call-tag request 265 and queries a merchant database 240 with the merchant identification number to obtain merchant-specific information such as the merchant's shipping address and billing account number.

In Step 350, the call-tag application 260 uses the buyer address from the merchant's call-tag request to query the carrier facility database 250 to determine which carrier facility is responsible for delivery and pickup for that the buyer address (the local carrier facility 255). In Step 360, the call-tag application 260 generates a shipping label and transmits it to the local carrier facility 255. The shipping label uses the buyer address (from the call-tag request 265) as the origination shipping address and the merchant address (from the merchant database 240) as the destination shipping address.

In Step 370, the call-tag application 260 bills the merchant for the cost of shipping the good from the buyer 220 to the merchant. Depending on the merchant's preference, the shipping fee may be deducted directly from a merchant account or the merchant can be separately billed. In Step 380, the carrier sends a driver from its local facility 225 to the buyer address. The driver picks up the package with the good to be returned, affixes the shipping label to the package and, delivers the good to the merchant address (Step 390).

The call-tag system 100 described above improves upon the traditional shipping process because the merchant pays the shipping costs and the package is picked up directly from the customer address. The system is limited, however, in that the merchant may ship the good that is being returned only to the merchant address or to another preselected address that the carrier has entered in the merchant database. In short, call-tag systems known in the art do not allow a merchant to specify a unique destination shipping address.

The effect of this limitation is illustrated in the context of a purchase made through an online auction. Online auction purchases, like sales through Internet retailers, have grown in popularity with the Internet. Unfortunately, auction fraud is also booming. At present, auction fraud ranks as the most common type of Internet scam and accounts for more than half of all consumer complaints on the Internet, according to the Federal Trade Commission (FTC).

Figure 4:
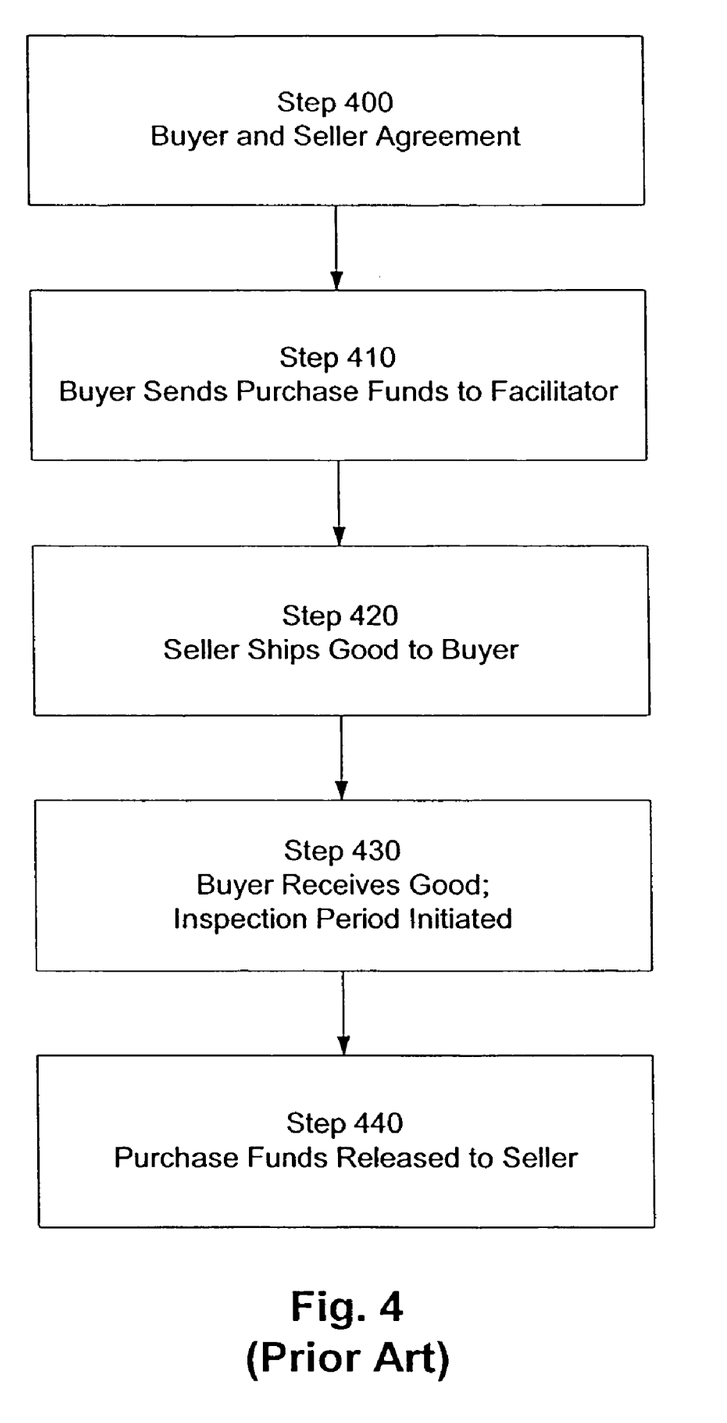
FIG. 4 is a process flow diagram of an online escrow service as known in the art.

To combat the problem of fraud in online auctions and other types of person to person sales over the Internet, online escrow services have arisen. FIG. 4 illustrates a typical online purchase using an escrow service. In Step 400, a buyer and seller agree to a purchase. In Step 410, the buyer mails the payment to the escrow service, which verifies the payment and alerts the seller that payment has been received. In Step 420, the seller ships the good to the buyer. In Step 430, the buyer receives the good and an agreed-upon inspection period (typically two days) begins. Finally, in Step 440, the buyer notifies the escrow agent of receipt of the good and authorizes the release of the payment to the seller.

A benefit of this process is that the buyer has the option of returning the good anytime within the inspection period. To do so, the buyer notifies the escrow agent of the return and ships the product back to the seller. During the return, the escrow agent retains control of the purchase money until it receives confirmation from the seller that the good product has been returned. In this way, both the buyer and seller retain some degree of control and protection as the transaction is fulfilled.

Much of the escrow process is dependent on timely shipping. Unfortunately, neither the traditional shipping process or the call-tag system 100 meets the needs of this business model. Typically, the escrow agent receives a fee for its role as a facilitator in the transaction. Part of that role is to handle the shipping fees as the product is shipped from the seller to the buyer and from the buyer to the seller in the case of a return. Under the traditional shipping process, the party that is shipping the good has the responsibility of paying the shipping fees. In addition, the shipper is obligated to package the product and deliver the package to a carrier drop off facility.

Nor does the call-tag system 100 fulfill the shipping needs of this online escrow business model. In the call-tag system 100, a merchant can pay to have a package picked up from a customer, but the merchant does not have the ability to specify a destination address. Thus, if the facilitator assumed the role of the merchant in a call-tag shipping system, the facilitator could only have the product shipped to the facilitator address. In other words, the call-tag system 100 does not permit a facilitator to request that a package be picked up from a first address and delivered to a second address where neither the first or second address is the address of the facilitator.

An unsatisfied need therefore exists for an improved shipping system that overcomes deficiencies in the prior art, some of which are discussed above.

SUMMARY OF THE INVENTION

The present invention is an improved shipping system that provides for third-party billing and the shipment of a package from a first location to a second location where neither the first or second location is the location of the third-party. An embodiment is disclosed in which a pre-existing call-tag system is modified to permit third-party billing and anywhere to anywhere functionality.

In accordance with an embodiment of the present invention, a shipping system is disclosed that allows a facilitator to request that a carrier pick up a package from a first location and deliver the package to a second location. The system of this embodiment includes a carrier shipping application that receives shipping information from a facilitator, the shipping information including address information for a first party located at the first location and address information for a second party located at the second location; the carrier shipping application configured to identify a local carrier facility responsible for package pickup at the first location; and the carrier shipping application further configured to generate shipping label information based at least in part on the shipping information received from the facilitator; a printing device located at the local carrier facility configured to receive the shipping label information from the carrier shipping application, and print a shipping label based at least in part on the shipping label information; and a carrier that receives the shipping label from the printing device, affixes the shipping label to the package at the first location and delivers the package to the second location.

In accordance with another embodiment of the present invention, the facilitator is located at a third location that is separate from the first and second locations. In accordance with another embodiment, the carrier charges a shipping fee to the facilitator that is based at least in part on the cost of delivery of the package from the first location to the second location. In still another disclosed embodiment, the shipping label information is formatted as one of an electronic image of a shipping label or as a proprietary flat file. In yet another embodiment, the shipping label includes a date and time and the carrier takes the shipping label to the first location at approximately the date and time specified on the shipping label.

In accordance with another embodiment of the present invention, a package delivery method that allows a facilitator to have a package picked up from a first location and delivered to a second location, the facilitator being at a third location separate from the first and second locations, is disclosed. In this embodiment, the method includes the steps of receiving shipping information from the facilitator, the shipping information including address information for the first and second locations; printing a shipping label based at least in part on the shipping information; affixing the shipping label to the package at the first location; delivering the package to the second location; and charging a shipping fee to the facilitator, the shipping fee based at least in part on the delivery of the package from the first location to the second location.

In accordance with another embodiment of the present invention the step of printing a shipping label includes identifying a local carrier facility responsible for pickup at the first location, and printing a shipping label on a printing device associated with the local carrier facility. In another embodiment, the step of affixing the shipping label to the package at the first location includes traveling to the first location to pick up the package, and affixing the shipping label to the package.

In accordance with another embodiment of the present invention a product fulfillment system is disclosed that allows a merchant to have a good purchased by a buyer delivered to said buyer from a supplier. The system in this embodiment includes a carrier shipping application that receives shipping information from a merchant, the shipping information including a supplier address and a buyer address, the carrier shipping application configured to identify a local carrier facility responsible for package pickup at the supplier address, and the carrier shipping application further configured to generate shipping label information based at least in part on the shipping information received from the merchant; a printing device located at the local carrier facility configured to receive the shipping label information from the carrier shipping application, and print a shipping label based at least in part on the shipping label information; and a carrier that receives a package containing the good at the supplier address, affixes the shipping label to the package, and delivers the package to the buyer address.

In another embodiment, the carrier shipping application identifies the local carrier facility by querying a carrier facility database with the supplier address. In another embodiment, the zip code of the supplier is used to query the carrier facility database. In still another embodiment, a package tracking number is assigned and included in the shipping label information generated by the carrier shipping application. In yet another embodiment, the carrier charges a shipping fee to the merchant and the shipping fee is based at least in part on the cost of delivering the package from the supplier to the buyer.

In accordance with another embodiment of the present invention a modified call-tag system is disclosed that is capable of fulfilling an anywhere to anywhere package shipping request. The system of this embodiment includes a client application configured to generate and transmit a call-tag record, the call-tag record comprising at least one of a call-tag request and an anywhere to anywhere request, the anywhere to anywhere request including a first shipping address and a second shipping address; a carrier application in electronic communication with the client application, the carrier application configured to receive the call-tag record from the client application, the carrier application additionally configured to determine whether the call-tag record includes the anywhere to anywhere delivery request, the carrier application further configured to generate a shipping label request based at least in part on the anywhere to anywhere request; a shipping label application in electronic communication with the carrier application, the shipping label application configured to receive the shipping label request and generate a shipping label; and a carrier in communication with at least one of the carrier application and the shipping label application to receive the shipping label, affix the shipping label to a package at the first address, and deliver the package to a second address.

In another embodiment, the carrier application determines whether the call-tag record includes an anywhere to anywhere request by examining whether the call-tag record includes a second shipping address. In an alternative embodiment, the call-tag record is examined to see whether it includes both a first shipping address and a second shipping address. In still another embodiment, the call-tag record is examined to see if it includes a unique destination address.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The following paragraphs describe a method and shipping system for anywhere to anywhere delivery in accordance with the present invention.

Figure 5:
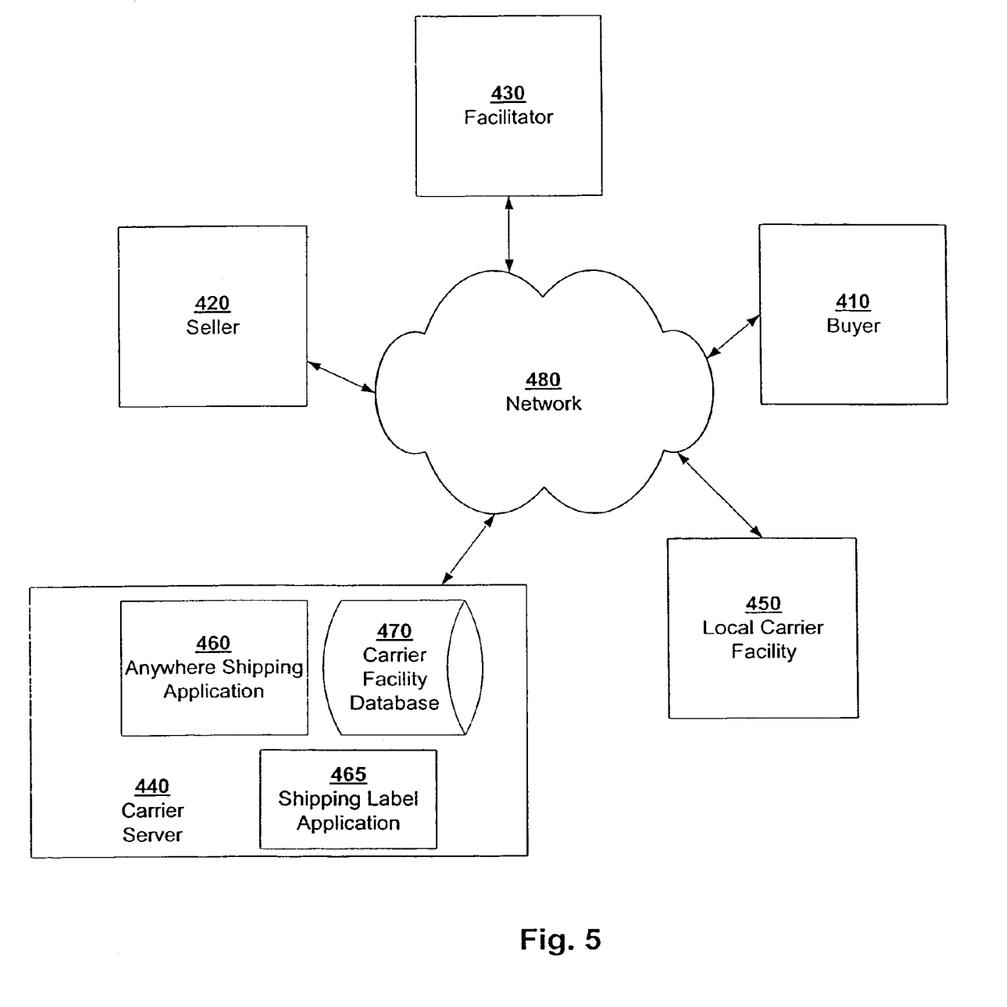
FIG. 5 is a high-level block diagram that illustrates the architecture of an anywhere to anywhere shipping system in accordance with a first embodiment of the present invention.

The block diagram of FIG. 5 illustrates a first embodiment of the anywhere to anywhere shipping system 400 of the present invention. This embodiment is described in the context of a person to person sale in an online transaction and involves a buyer 410, seller 420 and third-party facilitator 430. In this embodiment, the buyer 410 and seller 420 agree to the terms of a sale and agree to use a facilitator 430 to facilitate the sale. In a preferred embodiment, the buyer 410 and seller 420 are each in communication with the facilitator 430. Only one of the two parties needs to be in direct contact with the facilitator 430, however, and in alternative embodiments one of the buyer 410 and seller 420 communicate with the facilitator 430.

In this example, the buyer 410 and seller 420 communicate with the facilitator 430 via a network 480. In this example, the network 480 is the Internet; but it will be readily apparent that the communication described herein is not limited to communication between computers. The buyer 410 and seller 420 in an alternative embodiment could, for example, communicate with the facilitator 430 via telephone or facsimile.

As shown in the figure, the facilitator 430 is in electronic communication with a carrier server 440. In the preferred embodiment, the electronic communication between the facilitator 430 and carrier server occurs via the network 480. But again it will be readily apparent to one of ordinary skill in the art that the present invention may be implemented using other forms of communication.

An anywhere shipping application 460, a shipping label application 465 and a carrier facility database 470 reside on and are in electronic communication with the carrier server 440. In alternative embodiments, however, either or all of the carrier facility-shipping application 465, shipping label application 465 and carrier facility database 470 may reside on another server or other electronic device. In addition, a local carrier facility 450 is in communication with one or more of the above-described applications and/or databases via the network 480.

Figure 6:
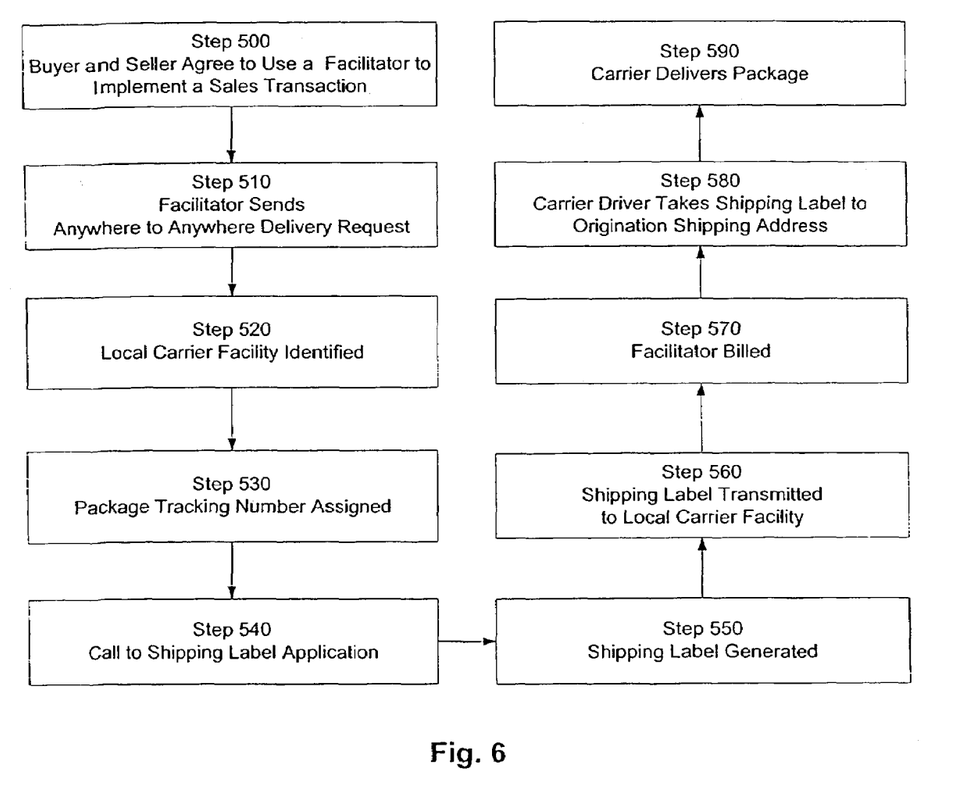
FIG. 6 is a process flow diagram of an anywhere to anywhere shipping system in accordance with a first embodiment of the present invention.

With reference to FIG. 6, the following paragraphs describe the operation of a first embodiment of the anywhere to anywhere shipping system 400. The process begins in Step 500 when a buyer 410 and seller 420 agree on a sales transaction and additionally agree to use a facilitator 430 to fulfill the transaction. Alternatively, only one of the buyer 410 and seller 420 may decide to use the facilitator 430 or, in yet another alternative, both parties may decide to use the facilitator 430 and only one party have communication with the facilitator 430.

A part of the sales agreement, one or both of the buyer 410 and seller 420 communicate the details of the sales agreement to the facilitator 430. In this example, part of the function of the facilitator 430 is as an escrow agent for the transaction. Therefore, information sent to the facilitator 430 will include details about the product sold, the sales price, addresses of the buyer and seller, the length of any inspection period and any other terms and conditions upon which the sale may be conditioned.

The buyer 410 initiates the transaction by sending a check or electronic transferring the agreed upon amount for the purchase of a good to the facilitator 430. In most cases, the facilitator 430 requires an additional fee for its services as an escrow agent and for the shipping costs. This fee may be charged as a facilitation fee and paid by the buyer in addition to the agreed upon sales price. Alternatively, the facilitator fee and associated shipping charges may be deducted from the purchase price when the funds are transferred to the seller 420 at the close of the transaction.

Upon receipt of the purchase funds from the buyer 410, the facilitator initiates the process of shipping the product from the seller 420 to the buyer 410. In a preferred embodiment, this shipment is initiated by the facilitator 430 sending an anywhere to anywhere delivery request 485 to a carrier server 440.

In Step 510, the carrier server 440 receives an anywhere to anywhere delivery request 485 that includes the addresses of the buyer 410 and seller 420, as well as facilitator-specific information including a facilitator account number and/or a billing address. In this example, the product is being shipped from a first location (the seller address) to a second location (the buyer address) and neither the first or second locations are the location of the facilitator 430. As described below, the facilitator 430 assumes responsibility for paying the fee associated with shipping the product from the seller 420 to the buyer 410 and, in the case of a return, the fee to ship the product from the buyer 410 back to the seller 420. In a preferred embodiment, a carrier offers several billing options to its customers. Thus, depending on the billing option chosen by the facilitator 430 the carrier may send a bill to a facilitator address or debit an existing facilitator account identified in the delivery request 485.

In Step 520, the anywhere shipping application 460 queries the carrier facility database 470 to identify the carrier facility that has responsibility for delivery and pickup for the seller address (the local carrier facility 450). The local carrier facility may be identified using the origination shipping address or zip code or via other means known in the art.

In Step 530, the anywhere shipping application 460 assigns a package tracking number to the transaction. The package tracking number is included on the shipping label of the package and provided to the facilitator 430. As is known in the art, parties use the package tracking number to track the shipment status as the package moves through the carrier system. In the context of an online escrow transaction, the package tracking number is used to identify when a package is delivered to the buyer address. The date and time of delivery as identified by the package tracking number can be used to trigger the initiation of the inspection period.

In one embodiment, the anywhere shipping application 460 assigns a package tracking number to the transaction. In an alternative embodiment, the anywhere shipping application 460 does not assign the package tracking number, but makes a call to a tracking application that assigns the package tracking number and updates the necessary package tracking databases accordingly.

In Step 540, the anywhere shipping application 460 makes a call to a shipping label application 465 using the shipping information provided in the delivery request 485 and has a shipping label generated. The process of generating an electronic shipping label is well known in the art. In general, the shipping information that must be provided by the facilitator 430 to generate any shipping label includes a minimum of an origination address, a destination address and information about the size and/or weight of the package to be shipped. Other information such as the package tracking number, routing code and carrier service level will also be provided to the label generation application by the anywhere shipping application 460.

In this embodiment, the delivery request 485 from the facilitator 430 specifies that the package is to be picked up from the seller's address. Therefore, scheduling information such as a date and time of pickup will also be captured and sent by the facilitator 430 and will be included in the delivery request 485.

In Step 550, the shipping label application 465 generates an electronic image of the shipping label from the information provided by the anywhere shipping application 460 and transmits the image back to the anywhere shipping application 460. In a preferred embodiment, the electronic image of the shipping label is sent as a proprietary flat file. However, it will be readily apparent to one of ordinary skill in the art that an electronic image may be formatted and transmitted in multiple graphical file formats known in the art.

Because this embodiment is described in the context of a sale of a good from a seller 420 to a buyer 410, the shipping label generated by the shipping label application 465 uses the seller's address as the origination shipping address and the buyer's address as the destination shipping address.

In Step 560, the anywhere shipping application 460 transmits the electronic image of the shipping label to the local carrier facility 450, where the shipping label is printed.

In Step 570, the anywhere application 460 calculates the shipping fee associated with shipping the package from the seller's address to the buyer's address and bills the facilitator 430 for the fee. In a preferred embodiment the facilitator 460 has an account with the carrier that is automatically debited. In an alternative embodiment, the carrier facilitator-shipping application 460 generates an electronic invoice for the shipping fee that is transmitted to the facilitator 430.

In Step 580, a carrier driver from the local carrier facility 450 receives the printed shipping label and takes the shipping label to the origination shipping address listed on the label, which for purposes of this embodiment is the seller's address. In a preferred embodiment, the shipping label also includes a preferred date and/or time for the pickup. The driver receives the package from the seller 420, affixes the shipping label to the good and places the package in the carrier system for delivery.

Finally, in Step 590 the carrier delivers the good to the destination shipping address, which in this embodiment is the location of the buyer 410.

In the context of the online sale from the seller 420 to the buyer 410, the delivery of the package to the buyer, as verified by the package tracking information, initiates an agreed-upon inspection period. In this example, the release of the purchase funds from the facilitator 430 to the seller 420 is contingent upon the buyer's acceptance of the product. In one embodiment, the purchase funds are released upon the buyer's express acceptance of the product. Alternatively, the facilitator 430 automatically releases the purchase funds to the seller 420 upon the expiration of the inspection period absent a notice of rejection by the buyer 410.

If the buyer 410 notifies the facilitator 430 of an intent to return the product to the seller 430, the facilitator 430 will notify the seller 420 of the return and send another anywhere delivery request 485 to the carrier. In such case, the operation proceeds as described above except that the product will originate with the buyer and the destination shipping address will be used as the seller's address.

The anywhere shipping application 460 assigns a separate tracking number for the return shipment and calls the shipping label application 465 to generate a new shipping label. The generated shipping label is sent to a printer of the carrier facility responsible for pickups and deliveries to the buyer address and a carrier driver takes the printed shipping label to the buyer 410. There, the carrier affixes the shipping label to the package and accepts the package for delivery to the seller 420.

The package tracking number assigned to the return shipment identifies when the package is returned to the seller. And upon confirmation of delivery to the seller 420, the facilitator 430 releases the purchase funds back to the buyer 410. In an alternative embodiment, the facilitator 430 may require confirmation from the seller 420 that the product was returned in the condition in which it was sent. Multiple ways of allocating the risk between a buyer and seller are well known in the art and are intended to be encompassed by the present invention.

In a preferred embodiment, the facilitator 430 is billed for the cost of shipping the product when a delivery request 485 is processed. Any additional allocation of shipping costs and the payment of the shipping costs from the purchase funds is left to the discretion of the buyer, seller and facilitator. The present invention encompasses any and every such allocation.

From the foregoing described embodiment, it will be readily apparent to one of ordinary skill in the art that the present invention permits a third party to request shipping from a first location and delivery to a second location with carrier pickup from the first location and third-party billing.

Figure 7:
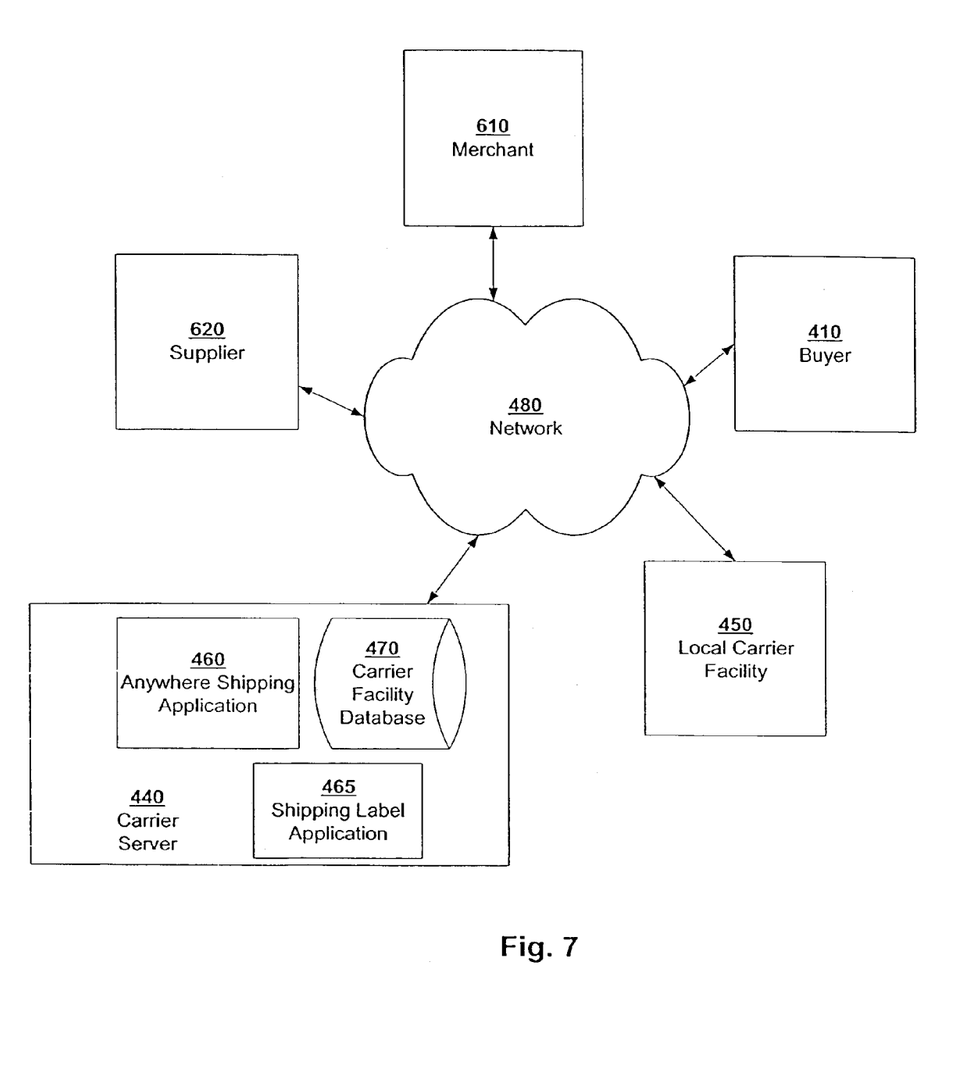
FIG. 7 is a high-level block diagram that illustrates the architecture of an anywhere to anywhere shipping system in accordance with a second embodiment of the present invention.

The block diagram of FIG. 7 illustrates a second embodiment of an anywhere to anywhere shipping system 400 in accordance with the present invention. The second embodiment is described in the context of a merchant 610, a buyer 410 and a supplier 620. In this illustration of the present invention, the buyer 410 purchases a good from a merchant 610. The merchant 610 does not have the good in stock but is able to locate the good from a supplier 620. Instead of waiting for the supplier 620 to ship the good to the merchant 610 only to have it re-shipped to the buyer 410, the merchant 610 requests that a carrier pickup the good from the supplier 620 and "drop ship" it directly to the buyer 410.

In FIG. 7, the buyer 410, merchant 610 and supplier 620 are connected via a network 480. However, electronic communication between the parties is not essential to the present invention. In alternative embodiments, a buyer 410 may purchase a good from a merchant 610 by telephone or facsimile. Similarly, a customer service representative employed by the merchant 610 might contact a supplier 620 by phone to order the good purchased by the buyer 410. In this embodiment the merchant 610 is also in electronic communication with a carrier server 440 via the network 480. But again it will be readily apparent to one of ordinary skill in the art that the present invention may be implemented using other forms of communication.

An anywhere shipping application 460, a shipping label application 465 and a carrier facility database 470 reside on and are in electronic communication with the carrier server 440. In alternative embodiments, however, the anywhere shipping application 465, shipping label application 465 or carrier facility database 470 may reside on another server or other electronic device. In addition, a local carrier facility 450 is in communication with one or more of the above-described applications and/or databases via the network 480.

Figure 8:
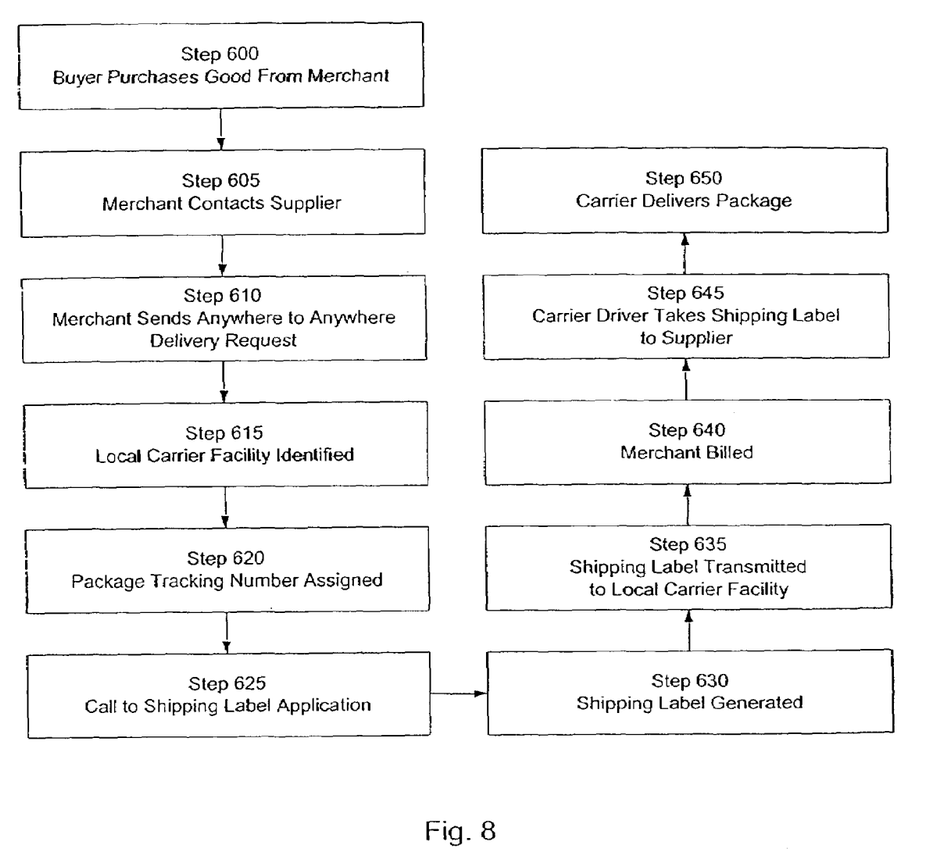
FIG. 8 is a process flow diagram of an anywhere to anywhere shipping system in accordance with a second embodiment of the present invention.

With reference to FIG. 8, the following paragraphs describe the operation of a second embodiment of the anywhere to anywhere shipping system 400. The process begins in Step 600 when a buyer 410 purchases a good from a merchant 610. In a preferred embodiment, the purchase is made through a web site operated by the merchant 610. In an alternative embodiment, however, the buyer 410 makes a purchase via a phone call to a customer service representative employed by the merchant 610.

In Step 605, the merchant 610 identifies a supplier 620 that has the good purchased by the buyer 410 in its inventory and reserves the good for pickup. The reason that the merchant 610 does not have the purchased good in its inventory is for the most part irrelevant to the present invention. The merchant 610 may have sold out of a good that it normally carries in its inventory, or the merchant 610 may keep little or no physical inventory and rely on suppliers to fulfill all such purchases.

In Step 610, the merchant sends an anywhere to anywhere delivery request 485 to the carrier that includes the addresses of the buyer 410 and supplier 620, as well as merchant-specific information including a merchant account number and/or billing address. In this example, the good is shipped from a first location (the supplier address) to a second location (the buyer address) and neither the first or second locations are the location if the merchant 610. As described below, the merchant 610 assumes the obligation of paying the fee to have the good shipped from the supplier 620 to the buyer 410. In a preferred embodiment, a carrier offers several billing options to its customers. Thus, depending n the billing option chosen by the merchant 610, the carrier may send a bill to the merchant address or debit a merchant account identified in the delivery request 485.

In Step 615, the anywhere shipping application 460 queries the carrier facility database 470 to identify the carrier facility that has responsibility for delivery and pickup for the supplier address (the local carrier facility 450). The local carrier facility may be identified using the origination shipping address or zip code or via other means known in the art.

In Step 620, the anywhere shipping application 460 assigns a package tracking number to the transaction. The package tracking number is included on the shipping label of the package and provided to the merchant 610. As is known in the art, parties use the package tracking number to track the shipment status as the package moves through the carrier system. In the context of a sales transaction, the package tracking number is used to identify when a package is delivered to the buyer address. The date and time of delivery as identified by the package tracking number can be used to trigger the merchant billing system.

In one embodiment, the anywhere shipping application 460 assigns a package tracking number to the transaction. In an alternative embodiment, the anywhere shipping application 460 does not assign the package tracking number, but makes a call to a tracking application that assigns the package tracking number and updates the necessary package tracking databases accordingly.

In Step 625, the anywhere shipping application 460 makes a call to a shipping label application 465 using the shipping information provided in the delivery request 485 and has a shipping label generated. The process of generating an electronic shipping label is well known in the art. In general, the shipping information that must be provided by the merchant 610 to generate any shipping label includes a minimum of an origination address, a destination address and information about the size and/or weight of the package to be shipped. Other information such as the package tracking number, routing code and carrier service level will also be provided to the label generation application by the anywhere shipping application 460.

In this embodiment, the delivery request 485 from the merchant 610 specifies that the package is to be picked up from the supplier address. Therefore, scheduling information such as a date and time of pickup will also be captured and sent by the merchant and included in the delivery request 485.

In Step 630, the shipping label application 465 generates an electronic image of the shipping label from the information provided by the anywhere shipping application 460 and transmits the image back to the anywhere shipping application 460. In a preferred embodiment, the electronic image of the shipping label is sent as a proprietary flat file. However, it will be readily apparent to one of ordinary skill in the art that an electronic image may be formatted and transmitted in multiple graphical file formats known in the art.

In this embodiment, the shipping label generated by the shipping label application 465 uses the supplier's address as the origination shipping address and the buyer's address as the destination shipping address.

In Step 635, the anywhere shipping application 460 transmits the electronic image of the shipping label to the local carrier facility 450, where the shipping label is printed.

In Step 640, the anywhere application 460 calculates the shipping fee associated with shipping the package from the supplier's address to the buyer's address and bills the merchant 610 for the appropriate shipping charge. In a preferred embodiment the merchant 610 has an account with the carrier that is automatically debited. In an alternative embodiment, the anywhere shipping application 460 generates an electronic invoice for the shipping fee that is transmitted to the merchant 610.

In Step 645, a carrier driver from the local carrier facility 450 receives the printed shipping label and takes the shipping label to the origination shipping address listed on the label, which for purposes of this embodiment is the supplier's address. In a preferred embodiment, the shipping label also includes a preferred date and/or time for the pickup. The driver receives the package from the supplier 620, affixes the shipping label to the good and places the package in the carrier system for delivery.

Finally, in Step 650 the carrier delivers the good to the destination shipping address, which in this embodiment is the location of the buyer 410.

The package tracking number assigned to the good shipment provides independent confirmation that the good is delivered to the buyer 410. Therefore, upon confirmation of delivery, the merchant 610 bills the buyer 410 for the purchase price of the good. Alternatively, the merchant 610 may elect to bill the buyer 410 when the buyer places the order, or alternatively when the carrier drivers accepts the good from the supplier 620. Multiple ways of allocating the risk between a merchant, supplier and buyer are known in the art and are intended to be encompassed by the present invention.

As indicated by the foregoing, it will be readily apparent to one of ordinary skill in the art that the present invention permits a third-party to request shipping from a first location and delivery to a second location with carrier pickup from the first location and third-party billing.

Figure 9:
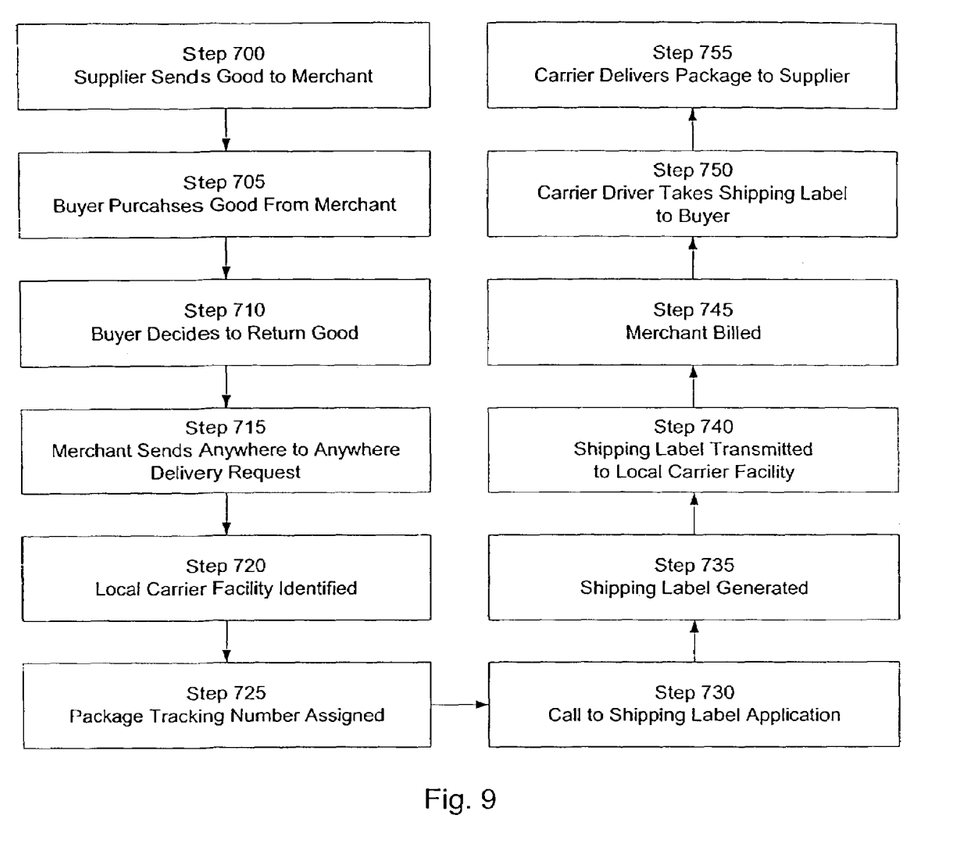
FIG. 9 is a process flow diagram of an anywhere to anywhere shipping system in accordance with another embodiment of the present invention.

FIG. 9 is a process flow diagram that illustrates a return transaction in accordance with an embodiment of the present invention. The process described is again in the context of a sales transaction between a buyer 410, merchant 610 and seller 620.

In Step 700, a supplier 620 supplies a good to a merchant 610. In Step 705, a buyer 410 purchases the good from the merchant 610 and the merchant 610 ships the good to the buyer 410. The buyer 410 receives the good in Step 710 but elects not to keep the good and contacts the merchant 610 to initiate a return.

In this example, the merchant 610 wants the good mailed back to the supplier 620 rather than to the merchant 610. The reason for this may be, for example, because the good is defective and the supplier 620 bears the risk of loss, or alternatively, the merchant 610 may exist only as an online presence and may not have a physical location equipped to receive returned goods.

In Step 715, the merchant 610 sends an electronic request for anywhere to anywhere delivery 485 to the carrier server 440 and the request is received by the anywhere shipping application 460. The anywhere delivery request 485 of this embodiment includes the buyer's address as the origination shipping address and the supplier's address as the destination shipping address. In Step 720, the anywhere shipping application 460 queries the carrier facility database 470 and determines which carrier facility is responsible for delivery and pickup for that buyer address (the local carrier facility 450).

In Step 725, the anywhere shipping application 460 assigns a package tracking number to the return transaction. The package tracking number is included on the shipping label of the package and provided to the merchant 610. As is known in the art, the parties use the package tracking number to track the shipment status as the package moves through the carrier system. In the context of a return, the package tracking number will identify when the package is picked up from the buyer 410 and may be used to shift the risk of loss to the merchant 610 and/or suppler 620. In addition, the package tracking number will identify when the package arrives as the supplier address and may be used to trigger the merchant 610 to credit a buyer account.

In one embodiment, the anywhere shipping application 460 assigns a package tracking number to the transaction. In an alternative embodiment, the anywhere shipping application 460 does not assign the package tracking number, but makes a call to a tracking application that assigns the package tracking number and updates the necessary package tracking databases accordingly.

In Step 730, the anywhere shipping application 460 makes a call to a shipping label application 465 using the shipping information provided in the delivery request 485 and has a shipping label generated. The process of generating an electronic shipping label is well known in the art. In general, the shipping information that must be provided by the merchant 610 to generate any shipping label includes a minimum of an origination address, a destination address and information about the size and/or weight of the package to be shipped. Other information such as the package tracking number, routing code and carrier service level will also be provided to the label generation application by the anywhere shipping application 460.

In this embodiment, the delivery request 485 from the merchant 610 specifies that the package is to be picked up from the buyer address. Therefore, scheduling information such as a date and time of pickup will also be captured and sent by the merchant and included in the delivery request 485.

In Step 735, the shipping label application 465 generates an electronic image of the shipping label from the information provided by the anywhere shipping application 460 and transmits the image back to the anywhere shipping application 460. In a preferred embodiment, the electronic image of the shipping label is sent as a proprietary flat file. However, it will be readily apparent to one of ordinary skill in the art that an electronic image may be formatted and transmitted in multiple graphical file formats known in the art.

In this embodiment, the shipping label generated by the shipping label application 465 uses the buyer's address as the origination shipping address and the supplier's address as the destination shipping address.

In Step 740, the anywhere shipping application 460 transmits the electronic image of the shipping label to the local carrier facility 450, where the shipping label is printed.

In Step 745, the anywhere application 460 calculates the shipping fee associated with shipping the package from the buyer's address to the supplier's address and bills the merchant 610 for the appropriate shipping charge. In a preferred embodiment the merchant 610 has an account with the carrier that is automatically debited. In an alternative embodiment, the anywhere shipping application 460 generates an electronic invoice for the shipping fee that is transmitted to the merchant 610.

In Step 750, a carrier driver from the local carrier facility 450 receives the printed shipping label and takes the shipping label to the origination shipping address listed on the label, which for purposes of this embodiment is the buyer's address. In a preferred embodiment, the shipping label also includes a preferred date and/or time for the pickup. The driver receives the package from the supplier 620, affixes the shipping label to the good and places the package in the carrier system for delivery.

Finally, in Step 755 the carrier delivers the good to the destination shipping address, which in this embodiment is the location of the supplier 410.

The package tracking number assigned to the good shipment provides independent confirmation that the good has been picked up from the buyer 410 and delivered to the supplier 620. Therefore, in a preferred embodiment, upon confirmation of package pickup, the merchant 610 credits the buyer 410 for the purchase price of the good. Alternatively, the merchant 610 may delay crediting the buyer account until the good is delivered to the seller 620. Multiple ways of allocating the risk between a merchant 610, supplier 620 and buyer 410 are known in the art and are intended to be encompassed by the present invention.

As indicated by the foregoing, it will be readily apparent to one of ordinary skill in the art that the present invention permits a third-party to request shipping from a first location and delivery to a second location with carrier pickup from the first location and third-party billing.

In each of the foregoing described embodiments, the anywhere to anywhere shipping system 400 of the present invention is described as a stand alone system for anywhere to anywhere delivery with carrier pick up and third-party billing. In contrast, the following paragraphs describe the modification of an existing call-tag system to create an anywhere to anywhere delivery system 400.

Another embodiment of an anywhere to anywhere system 400 is the result of a modification of a call-tag system 100 to include the functionality of third-party billing and anywhere to anywhere delivery. To illustrate, assume a call-tag system 100 that is known in the art is already established to accommodate the return of a good from a buyer 410 to a merchant 610. In this system, to initiate a call-tag return, the merchant 610 sends a call-tag request 265 to a carrier. The call-tag request 265 is an electronic file that includes, among other things, the buyer address and a merchant identifier.

Upon receipt of the call-tag request 265, a call-tag application 260 that resides on a carrier server queries a merchant database 240 using the merchant identifier to obtain, among other things, a return shipping address and billing account number for the merchant 610. In this example, the call-tag application 260 is configured to use the return shipping address as the destination address in a shipping label that will be generated for the return transaction. Further, the call-tag application 260 is configured to bill the shipping cost for the return using the merchant billing information.

Another embodiment of the anywhere to anywhere system 400 of the present invention is to modify an existing call-tag system 400 to provide for anywhere to anywhere shipping and third party delivery. In a preferred embodiment, a unique merchant identifier is assigned to a merchant 610 that requests anywhere to anywhere functionality. The anywhere merchant identifier 490 may replace or be in addition to the merchant identifier that is traditionally included in a call-tag request 265.

In a traditional call-tag system 100, the call-tag application 260 uses the merchant identifier to query a database and obtain the merchant address. This merchant address is, in turn, used as the destination address of a shipping label. In the modified call-tag system, when the call-tag application 260 receives a call-tag request 265 with an anywhere to anywhere merchant identifier 290, the merchant address is not used as the destination address of the shipping label. Instead, the call-tag request 265 obtains a unique destination address from a predetermined location within the call-tag request 265 and uses that address as the destination address of the shipping label.

In this way, an anywhere to anywhere shipping system 400 according to one embodiment of the present invention is obtained by modifying an existing call-tag system 100.

In an alternative embodiment, a call-tag system 100 can be modified without the use of an anywhere merchant identifier 490. In this embodiment, the call-tag application 260 is configured to check an anywhere destination address field 295 within the call-tag request record for an address. If the field is blank or returns a null value, the call-tag application 260 processes the request as a normal call-tag request 265. But if the anywhere destination address field 295 contains data, the call-tag application 260 is configured to use that data as the destination address of the shipping label. Additional modifications to these systems are possible and are intended to be encompassed by the present invention.

It will be readily apparent that the carrier facility-shipping application 460 disclosed herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A modified call-tag system capable of fulfilling an anywhere to anywhere package shipping request, the system comprising:
   (A) a customer computer executing:
      a client application configured to generate and transmit a call-tag record, said call-tag record comprising at least one of a call-tag request or an anywhere to anywhere request, said call-tag request comprising data identifying a buyer and a unique merchant identifier, and said anywhere to anywhere request comprising a first shipping address and a second shipping address; and
   (B) one or more servers in electronic communication with said customer computer, said one or more servers executing:
      (1) a carrier application configured to:
         receive said call-tag record from said client application;
         determine whether said call-tag record includes either said anywhere to anywhere request or said call-tag request;
         in response to determining that said call-tag record includes said anywhere to anywhere request, generate a shipping label request based at least in part on said anywhere to anywhere request and said first and second shipping addresses of said anywhere to anywhere request; and
         in response to determining that said call-tag record includes said call-tag request: (1) determine an address associated with said buyer based at least in part on said data identifying said buyer, (2) use said unique merchant identifier to query a merchant database in order to determine an address associated with said merchant, and (3) generate a shipping label request based at least in part on said call-tag request and said buyer and merchant addresses; and
      (2) a shipping label application in electronic communication with said carrier application, said shipping label application configured to receive said shipping label request and to generate a shipping label based at least in part on said shipping label request, said shipping label indicating that said package should be shipped from a first location to a second location,
   wherein said first and second locations correspond to said first and second shipping addresses, respectively, when said shipping label request is based at least in part on said anywhere to anywhere request, and said first and second locations are based at least in part on said buyer and merchant addresses, respectively, when said shipping label request is based at least in part on said call-tag request.

2. The system of claim 1, wherein said carrier application determines whether said call-tag record includes said anywhere to anywhere request by examining whether said call-tag record includes a second shipping address.

3. The system of claim 1, wherein said carrier application determines whether said call-tag record includes said anywhere to anywhere request by examining whether said call-tag record includes both a first shipping address and a second shipping address.

4. The system of claim 1, wherein said carrier application determines whether said call-tag record includes said anywhere to anywhere request by examining whether said call-tag record includes a unique destination address.

5. The system of claim 1, wherein said package is being shipped from a buyer to a merchant, and wherein said carrier application determines whether said call-tag record includes said anywhere to anywhere request by determining whether said call-tag record includes a unique identifier provided to said merchant for use when requesting an anywhere to anywhere shipment.

6. The system of claim 1, wherein said buyer desires to return said package to said merchant.

7. The system of claim 1, wherein said first and second locations correspond to said buyer and merchant addresses, respectively.

8. The system of claim 1, wherein said client application corresponds to a merchant arranging for return of said package from a buyer, and wherein said carrier application is further configured to charge a shipping fee to said merchant.

* * * * *